(12) United States Patent
Huang et al.

(10) Patent No.: US 12,389,281 B2
(45) Date of Patent: Aug. 12, 2025

(54) SYSTEMS AND METHODS FOR NETWORK-BASED SLICE ACCESS AUTHORIZATION

(71) Applicant: Verizon Patent and Licensing Inc., Basking Ridge, NJ (US)

(72) Inventors: Ye Huang, San Ramon, CA (US); Miguel A. Carames, Long Valley, NJ (US); Lily Zhu, Parsippany, NJ (US); Jyotsna Kachroo, Millburn, NJ (US); Suzann Hua, Beverly Hills, CA (US); Sudhakar Reddy Patil, Flower Mound, TX (US); Umesh Kumar Gupta, Morris Plains, NJ (US); Bjorn Hjelm, Livermore, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 464 days.

(21) Appl. No.: 17/821,879

(22) Filed: Aug. 24, 2022

(65) Prior Publication Data
US 2024/0073745 A1    Feb. 29, 2024

(51) Int. Cl.
*H04W 28/20*      (2009.01)
*H04W 28/02*      (2009.01)
*H04W 72/0453*    (2023.01)
*H04W 72/23*      (2023.01)

(52) U.S. Cl.
CPC ....... *H04W 28/20* (2013.01); *H04W 28/0215* (2013.01); *H04W 72/0453* (2013.01); *H04W 72/23* (2023.01)

(58) Field of Classification Search
CPC ............. H04W 28/20; H04W 28/0215; H04W 72/0453; H04W 72/23; H04W 60/00
See application file for complete search history.

(56) References Cited

U.S. PATENT DOCUMENTS

| | | | |
|---|---|---|---|
| 2021/0058748 A1* | 2/2021 | Liao | H04W 76/11 |
| 2023/0067830 A1* | 3/2023 | Tiwari | H04W 12/06 |
| 2023/0096402 A1* | 3/2023 | Kang | H04W 48/16 |
| | | | 455/435.1 |
| 2023/0180009 A1* | 6/2023 | Balmakhtar | H04W 12/48 |
| | | | 726/4 |

* cited by examiner

*Primary Examiner* — Habte Mered

(57) ABSTRACT

A method may include receiving, by at least one network device and from a user device, a registration message including a service identifier and at least one of a network slice identifier or a network slice token. The method may also include determining, based on information included in the registration message, whether the user device is authorized to use a network slice associated with the service identifier. The method may further include setting up a data session to be serviced by the network slice, in response to determining that the user device is authorized to use the network slice.

20 Claims, 7 Drawing Sheets

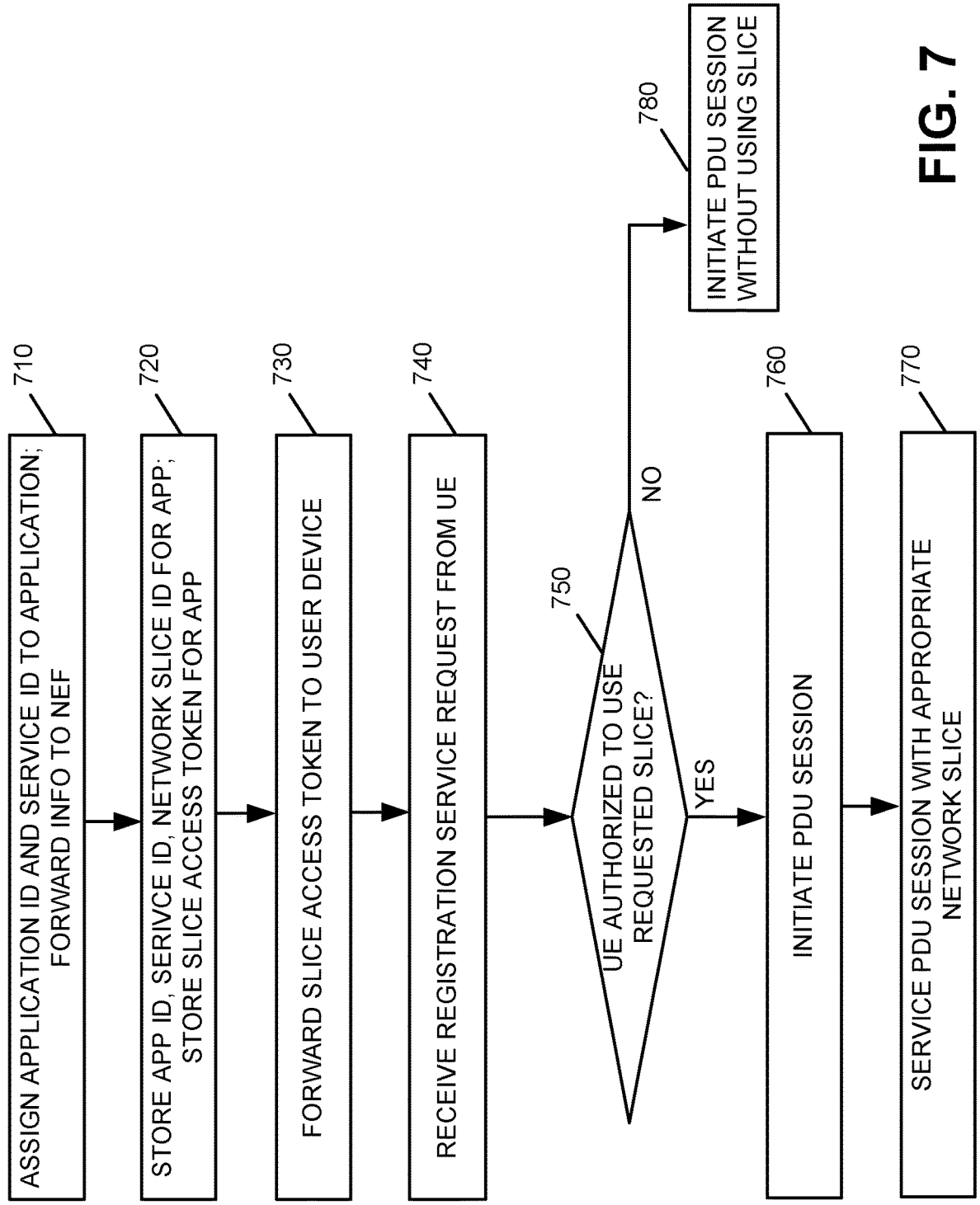

SYSTEMS AND METHODS FOR NETWORK-BASED SLICE ACCESS AUTHORIZATION

BACKGROUND INFORMATION

The concept of network slices within Fifth Generation (5G) networks is one of the benefits of 5G. Slices may be associated with a particular Quality of Service (QoS). User devices typically need to be authorized to use network slices to avoid overloading the network slices with unauthorized data traffic. Despite authorization requirements, however, network slices are still vulnerable to unauthorized usage due to the security of the user device execution environment being compromised, fraud or other reasons.

BRIEF DESCRIPTION OF THE DRAWINGS

FIG. 7 is another flow diagram illustrating exemplary processing associated with network slice access authorization in accordance with another exemplary implementation.

DETAILED DESCRIPTION OF EXAMPLE EMBODIMENTS

The following detailed description refers to the accompanying drawings. The same reference numbers in different drawings may identify the same or similar elements.

Implementations described herein provide for network slice access authorization to avoid unauthorized network slice usage. In exemplary implementations, network elements in a core network associated with routing data traffic provide a user device initiated solution to authorizing network slice usage. For example, in one implementation, a user device requests and receives network slice information, which is later verified by the core network prior to setting up a data session serviced by the requested network slice. In another implementation, an application server may initiate the network slice authorization process by providing slice related information to a user device. The network slice authorization information may then be verified by core network elements prior to setting up a data session serviced by the requested slice. In each case, core network elements determine whether the user device is authorized to use a network slice to provide a unified approach to network slice authorization. In this manner, unauthorized network slice usage may be avoided.

Figure 1:
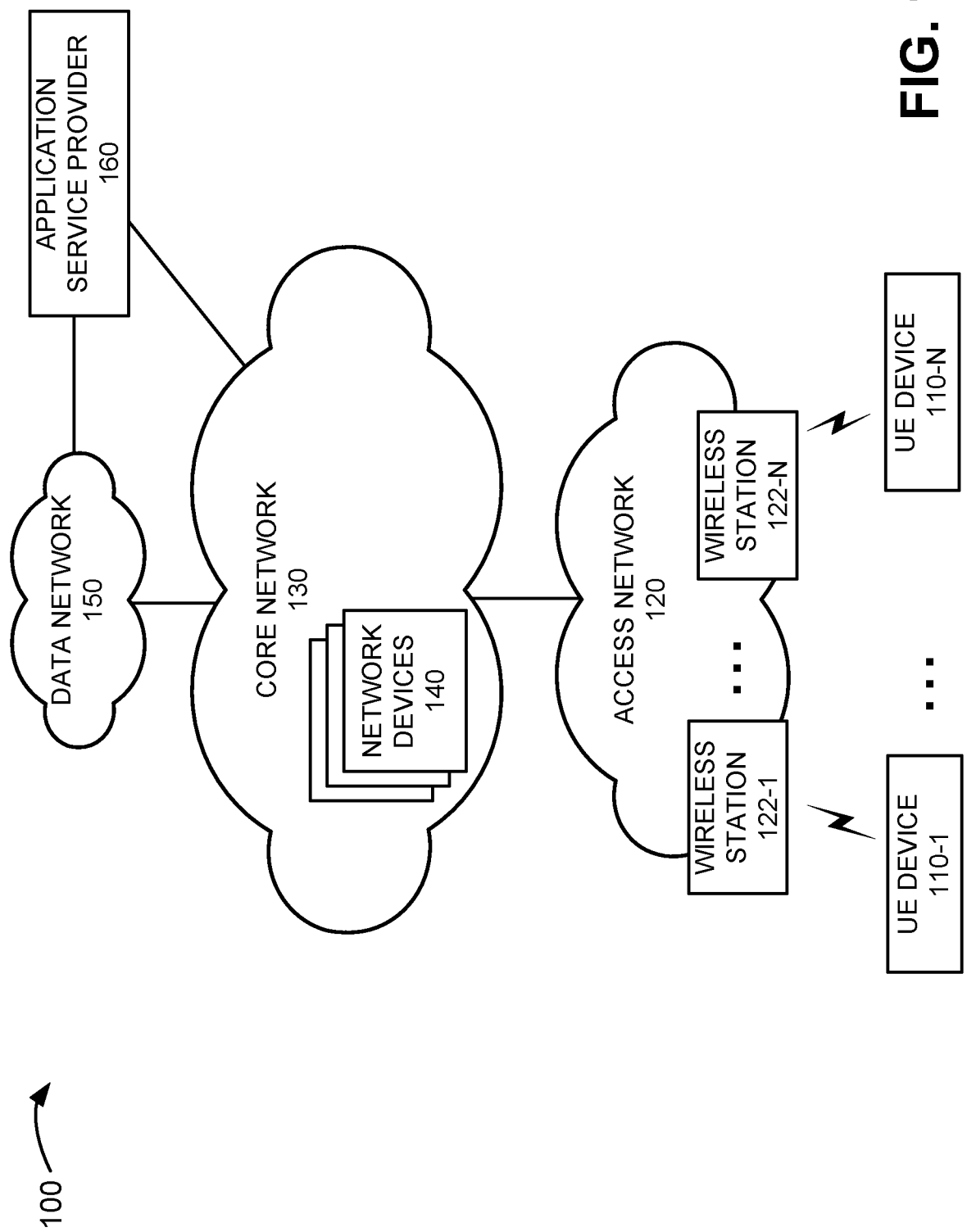
FIG. 1 illustrates an exemplary environment in which systems and methods described herein may be implemented.

FIG. 1 is a diagram illustrating an exemplary environment 100 in which systems and methods described herein may be implemented. Referring to FIG. 1, environment 100 includes user equipment (UE) device 110-1 through 110-N, access network 120, wireless stations 122-1 through 122-N, core network 130, network devices 140, data network 150 and application service provider 160.

UE devices 110-1 and 110-2 (referred to herein individually as UE device or UE 110, and collectively as UE devices or UEs 110) may include any computing device, such as a personal computer (PC), a laptop computer, a server, a tablet computer, a notebook, a Chromebook®, a mobile device, such as wireless or cellular telephone device (e.g., a conventional cell phone with data processing capabilities), a smart phone, a personal digital assistant (PDA) that can include a radiotelephone, any type of mobile computer device or system, a game playing device, a music playing device, a home appliance device, a home monitoring device, a virtualized system, etc., that includes communication functionality. UE device 110-1 may connect to access network 120 via wireless station 122-1 and UE device 110-N may connect to access network 120 via wireless station 122-N. UE devices 110 may also connect to other devices in environment 100 via any conventional technique, such as wired, wireless, optical connections or a combination of these techniques. UE device 110 and the person associated with UE device 110 (e.g., the party holding or using UE device 110) may be referred to collectively as UE device 110 or UE 110 in the description below.

Access network 120 may provide access to transport network 130 for wireless devices, such as UE devices 110. Access network 120 may enable UE device 110 to connect to core network 130 for Internet access, non-Internet Protocol (IP) data delivery, cloud computing, mobile telephone service, Short Message Service (SMS) message service, Multimedia Message Service (MMS) message service, and/or other types of data services. Access network 120 may provide access to core network 130, a service or application layer network, a cloud network, a multi-access edge computing (MEC) network, a fog network, etc. Furthermore, access network 120 may enable a device in core network 130 to exchange data with UE device 110 using a non-IP data delivery method such as Data over Non-Access Stratum (DoNAS).

Access network 120 may also include a 5G access network or another advanced network, such as a Fourth Generation (4G) Long Term Evolution (LTE) access network. Additionally, access network 120 may include functionality such as the functionality of a millimeter (mm) Wave Radio Access Network (RAN). Access network 120 may also include: support for advanced or massive multiple-input and multiple-output (MIMO) antenna configurations (e.g., an 8×8 antenna configuration, a 16×16 antenna configuration, a 256×256 antenna configuration, etc.); support for cooperative MIMO (CO-MIMO) configurations; support for carrier aggregation; relay stations; Heterogeneous Networks (HetNets) of overlapping small cells and macrocells; Self-Organizing Network (SON) functionality; machine type communication (MTC) functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of 5G functionality.

Wireless stations 122 (referred to collectively as wireless stations 122 and individually as wireless station 122) may be included in access network 120. Each wireless station 122 may service a number of UE devices 110 and/or other user devices when the particular device is within radio frequency range of wireless station 122. In one implementation, wireless station 122 may include 5G base station (e.g., a next generation NodeB (gNB)) that includes one or more radio frequency (RF) transceivers. For example, wireless station 122 may include three RF transceivers and each RF transceiver may service a 120 degree sector of a 360 degree field of view. Each RF transceiver may include or be coupled to an antenna array. The antenna array may include an array of controllable antenna elements configured to send and receive 5G new radio (NR) wireless signals via one or more antenna beams. In other implementations, wireless station 122 may also include a 4G base station (e.g., an evolved NodeB (eNodeB)) or a 6G base station that communicates wirelessly with UEs 110 located within the radio frequency range of wireless station 122.

Core network 130 may include one or more wired, wireless and/or optical networks that are capable of receiving and transmitting data, voice and/or video signals. In an exemplary implementation, core network 130 may be associated with a telecommunications service provider (e.g., a service provider providing cellular wireless communication services and wired communication services) and may manage communication sessions of UE devices 110 connecting to core network 130 via access network 120. Core network 130 may include one or multiple networks of different types and technologies. For example, core network 130 may be implemented to include a next generation core (NGC) network for a 5G network, an Evolved Packet Core (EPC) of an LTE or LTE Advanced network, a sixth generation (6G) network, and/or a legacy core network. Core network 130 may provide packet-switched services and wireless IP connectivity to various components in environment 100, such as UE devices 110, to provide, for example, data, voice, and/or multimedia services.

Core network 130 may include various network devices 140. Depending on the implementation, network devices 140 may include 5G core network components (e.g., a User Plane Function (UPF), an Access and Mobility Management Function (AMF), a Network Exposure Function (NEF), a Session Management Function (SMF), a Unified Data Management (UDM) function, a Unified Data Repository (UDR), a Policy Control Function (PCF), a Charging Function (CHF), etc.), 4G core network components (e.g., a Serving Gateway (SGW), a Packet data network Gateway (PGW), a Mobility Management Entity (MME), a Home Subscriber Server (HSS), a Policy Charging and Rules Function (PCRF) etc.), or another type of core network components (e.g., future 6G network components). In other implementation, network devices 140 may include combined 4G and 5G functionality, such as a session management function with PGW-control plane (SMF+PGW-C) and a user plane function with PGW-user plane (UPF+PGW-U).

Data network 150 may include, for example, a packet data network. In an exemplary implementation, UE device 110 may connect to data network 150 via core network 130. Data network 150 may also include and/or be connected to a local area network (LAN), a wide area network (WAN), a metropolitan area network (MAN), an autonomous system (AS) on the Internet, an optical network, a cable television network, a satellite network, a wireless network, an ad hoc network, a telephone network (e.g., the Public Switched Telephone Network (PSTN) or a cellular network), an intranet, or a combination of networks.

Application service provider 160 may include one or more computer devices and/or servers that store applications (referred to herein as "apps") and provide the applications and services associated with the applications to users, such as UE devices 110. For example, application service provider 160 may provide a particular application accessed by UE device 110 via core network 130. In some implementations, application service provider 160 may also provide network slice tokens to UE devices 110, as described in detail below.

The exemplary configuration illustrated in FIG. 1 is provided for simplicity. It should be understood that a typical environment may include more or fewer devices than illustrated in FIG. 1. For example, environment 100 may include a large number (e.g., thousands or more) of UE devices 110 and wireless stations 122, as well as multiple access networks 120 that connect UE devices 110 to core network 130. Environment 100 may also include elements, such as gateways, monitoring devices, network elements/functions, etc. (not shown), that aid in providing data services and routing data in environment 100.

Various functions are described below as being performed by particular components in environment 100. In other implementations, various functions described as being performed by one device may be performed by another device or multiple other devices, and/or various functions described as being performed by multiple devices may be combined and performed by a single device.

Figure 2:
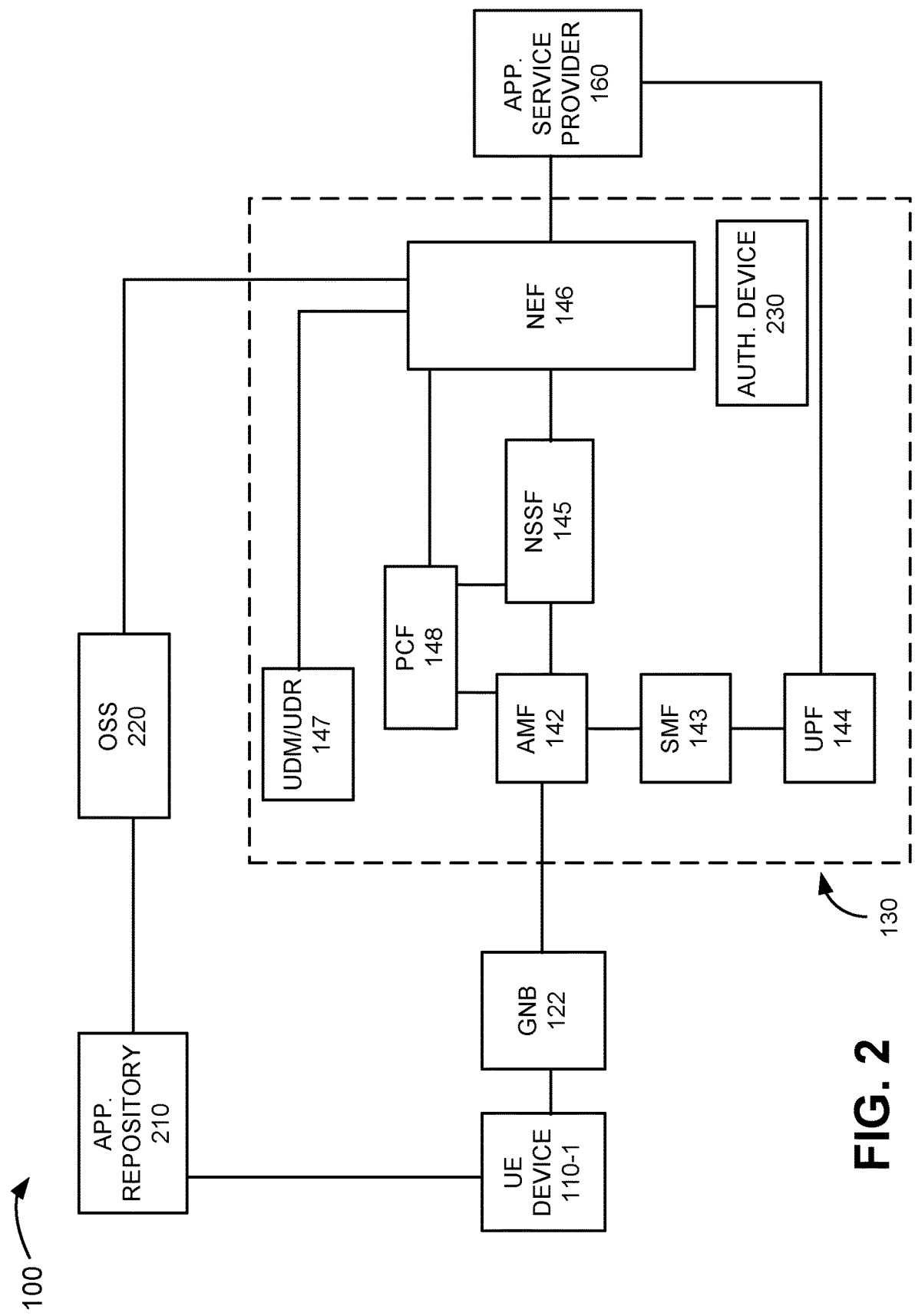
FIG. 2 is a block diagram of components implemented in the environment of FIG. 1 in accordance with an exemplary implementation.

FIG. 2 illustrates a portion of environment 100, including elements implemented in core network 130 in accordance with an exemplary implementation. Referring to FIG. 2, network devices 140 in core network 130 include AMF 142, SMF 143, UPF 144, NSSF 145, NEF 146, UDM/UDR 147 and PCF 148. It should be understood that core network 130 may include other elements and/or differently arranged elements. Environment 100 also includes application repository 210, operational support system (OSS) 220 and authorization device 230.

As illustrated in FIG. 2, UE device 110-1 may connect to core network 130 via wireless station 122, shown in FIG. 2 as gNB 122. Application service provider 160 may also connect to elements in core network 130, such as UPF 144 and NEF 146.

Application repository 210 may store applications accessed and provided to UE devices 110. For example, application repository 210 may correspond to an "app store" via which users access applications. In some implementations, application repository 210 may store applications provided by application service provider 160. In an exemplary implementation, application repository 210 may store an application identifier (ID) and a corresponding service ID for each application. OSS 220 may provide services associated with applications stored in application repository 210. For example, in one implementation, OSS 210 may generate application IDs and service IDs for each application in application repository 210 and provide this information for storage in application repository 210.

Authorization device 230 may include a computing device or server that generates tokens or other authorization information for use in authorizing access to a network slice, as described in detail below. For example, in one implementation, authorization device 230 may correspond to an OAuth 2.0 authorization server that generates tokens for use by user devices 110 executing particular applications to access network slices during data sessions. Authorization device 230 and/or other devices in, for example, core network 130 may validate the token using, for example, a public key or other authentication mechanism to determine whether the token is valid.

AMF 142 may perform registration management, connection management, reachability management, mobility management, lawful intercepts, Short Message Service (SMS) transport, transport of session management messages between UE device 110 and other network devices, such as SMF 143, access authentication and authorization, location services management, functionality to support non-3GPP access networks, and/or other types of management processes. In an exemplary implementation, AMF 142 may perform slice access authorization, as described in detail below.

UPF 144 may maintain an anchor point for intra/inter-RAT mobility, maintain an external Packet Data Unit (PDU) point of interconnect to a particular data network (e.g., data network 150), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a RAN node (e.g., gNB 122), and/or perform other types of user plane processes.

SMF 143 may perform session establishment, session modification, and/or session release, perform IP address allocation and management, perform Dynamic Host Configuration Protocol (DHCP) functions, perform selection and control of UPF 144, configure traffic steering at UPF 144 to guide the traffic to the correct destinations, terminate interfaces toward PCF 148, perform lawful intercepts, charge data collection, support charging interfaces, control and coordinate of charging data collection, terminate session management parts of Non-Access Stratum (NAS) messages, perform downlink data notification, manage roaming functionality, and/or perform other types of control plane processes for managing user plane data.

NSSF 145 may select a set of network slice instances to serve a particular UE device 110, determine network slice selection assistance information (NSSAI) or a Single-NSSAI (S-NSSA), determine a particular AMF 142 to serve a particular UE device 110, and/or perform other types of processing associated with network slice selection or management.

NEF 146 may expose capabilities and events to other network functions (NFs), including third party NFs, application functions (AFs), edge computing NFs, and/or other types of NFs. Furthermore, NEF 146 may secure provisioning of information from external applications to core network 130, translate information between core network 130 and devices/networks external to core network 130, support a Packet Flow Description (PFD) function, and/or perform other types of network exposure functions. In an exemplary implementation, NEF 146 may store information regarding network slice access and perform network slice access authorization checking, as described in detail below.

UDM/UDR 147 may maintain subscription information for UE devices 110, manage subscriptions, generate authentication credentials, handle user identification, perform access authorization based on subscription data, perform network function registration management, maintain service and/or session continuity by maintaining assignment of SMF 143 for ongoing sessions, support SMS delivery, support lawful intercept functionality, and/or perform other processes associated with managing user data.

PCF 148 may support policies to control network behavior, provide policy rules to control plane functions (e.g., to SMF 143), access subscription information relevant to policy decisions, render policy decisions, and/or perform other types of processes associated with policy enforcement.

Environment 100 illustrated in FIG. 2 may include additional elements and/or NFs that are not illustrated. It should also be understood that functions described as being performed by various elements in FIG. 2, including elements in core network 130, may be performed by other elements/functions in other implementations.

Figure 3:
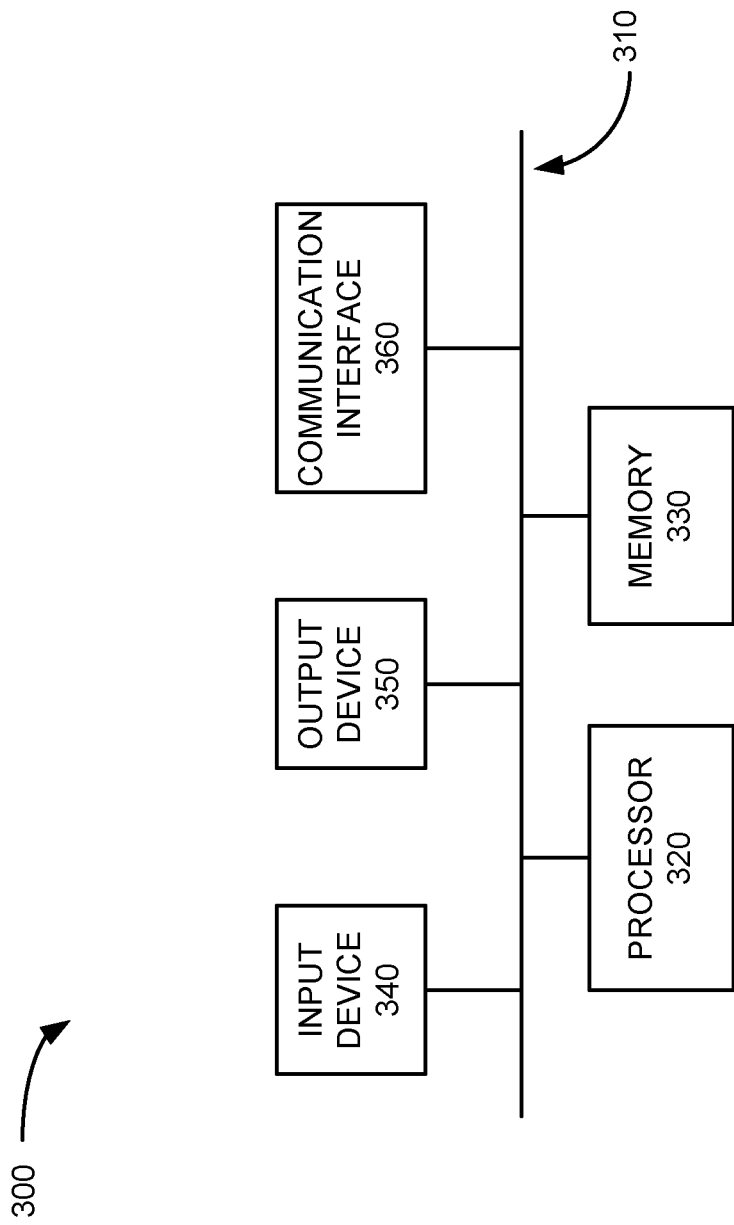
FIG. 3 illustrates logic components implemented in one or more of the devices illustrated in FIGS. 1 and 2 in accordance with an exemplary implementation.

FIG. 3 illustrates an exemplary configuration of a device 300. One or more devices 300 may correspond to or be included in devices in environment 100, such as UE device 110, wireless station 122, network devices 140, such as AMF 142, SMF 143, UPF 144, NSSF 145, NEF 146, UDM/UDR 147, PCF 148, application service provider 160, application repository 210, OSS 220, authorization device 230 and other devices included in environment 100. Referring to FIG. 3, device 300 may include bus 310, processor 320, memory 330, input device 340, output device 350 and communication interface 360. The exemplary configuration illustrated in FIG. 3 is provided for simplicity. It should be understood that device 300 may include more or fewer components than illustrated in FIG. 3. Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SSD). Memory 330 may also include a magnetic and/or optical recording medium (e.g., a hard disk) and its corresponding drive.

Input device 340 may include a mechanism that permits a user to input information, such as a keypad, a keyboard, a mouse, a pen, a microphone, a touch screen, voice recognition and/or biometric mechanisms, etc. Output device 350 may include a mechanism that outputs information to the user, including a display (e.g., a liquid crystal display (LCD)), a speaker, etc. In some implementations, device 300 may include a touch screen display may act as both an input device 240 and an output device 350.

Communication interface 360 may include one or more transceivers that device 300 uses to communicate with other devices via wired, wireless or optical mechanisms. For example, communication interface 360 may include one or more radio frequency (RF) transmitters, receivers and/or transceivers and one or more antennas for transmitting and receiving RF data. Communication interface 360 may also include a modem or an Ethernet interface to a LAN or other mechanisms for communicating with elements in a network.

In an exemplary implementation, device 300 performs operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), solid state drive (SSD), etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
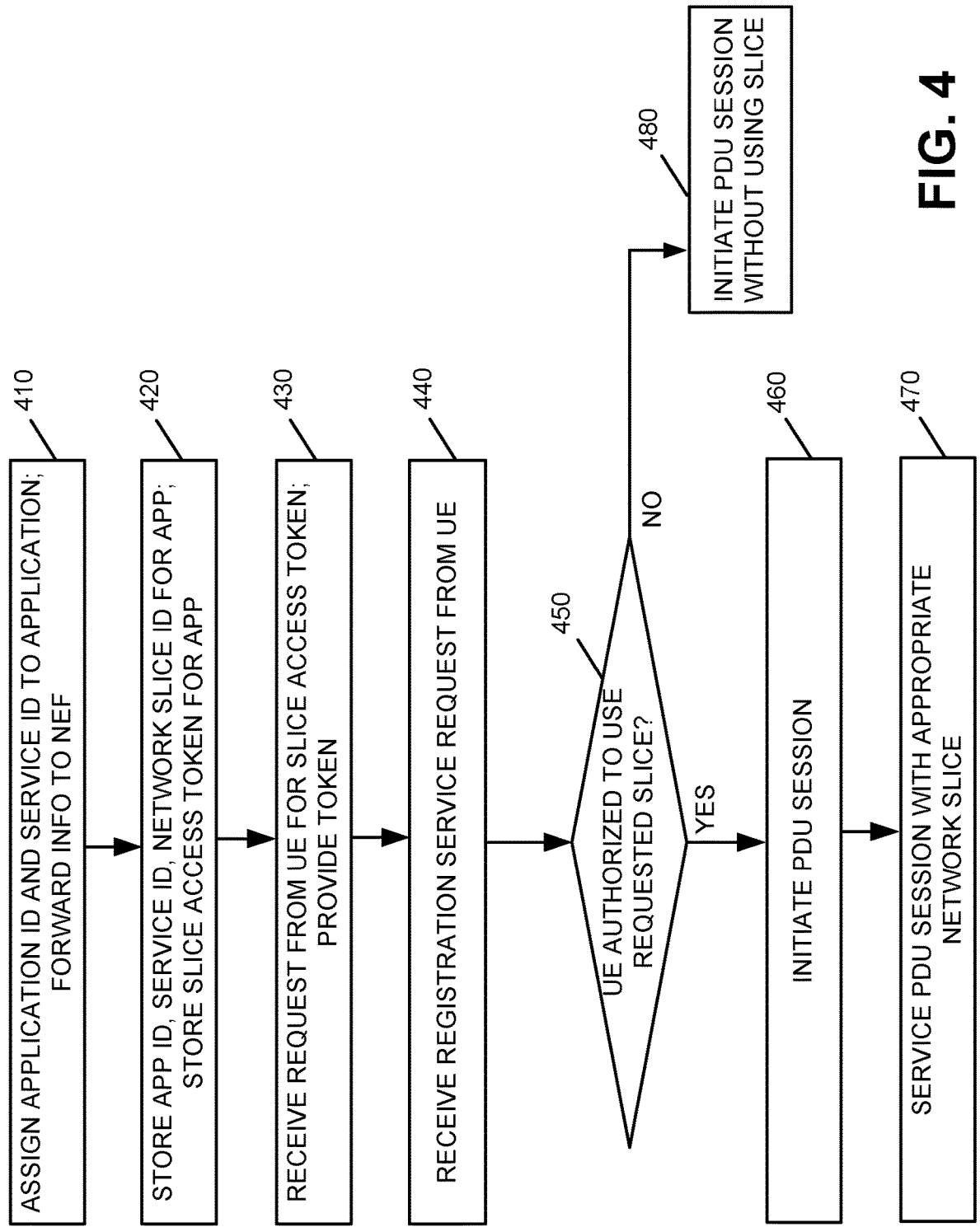
FIG. 4 is a flow diagram illustrating processing associated with network slice access authorization in accordance with an exemplary implementation.
Figure 5:
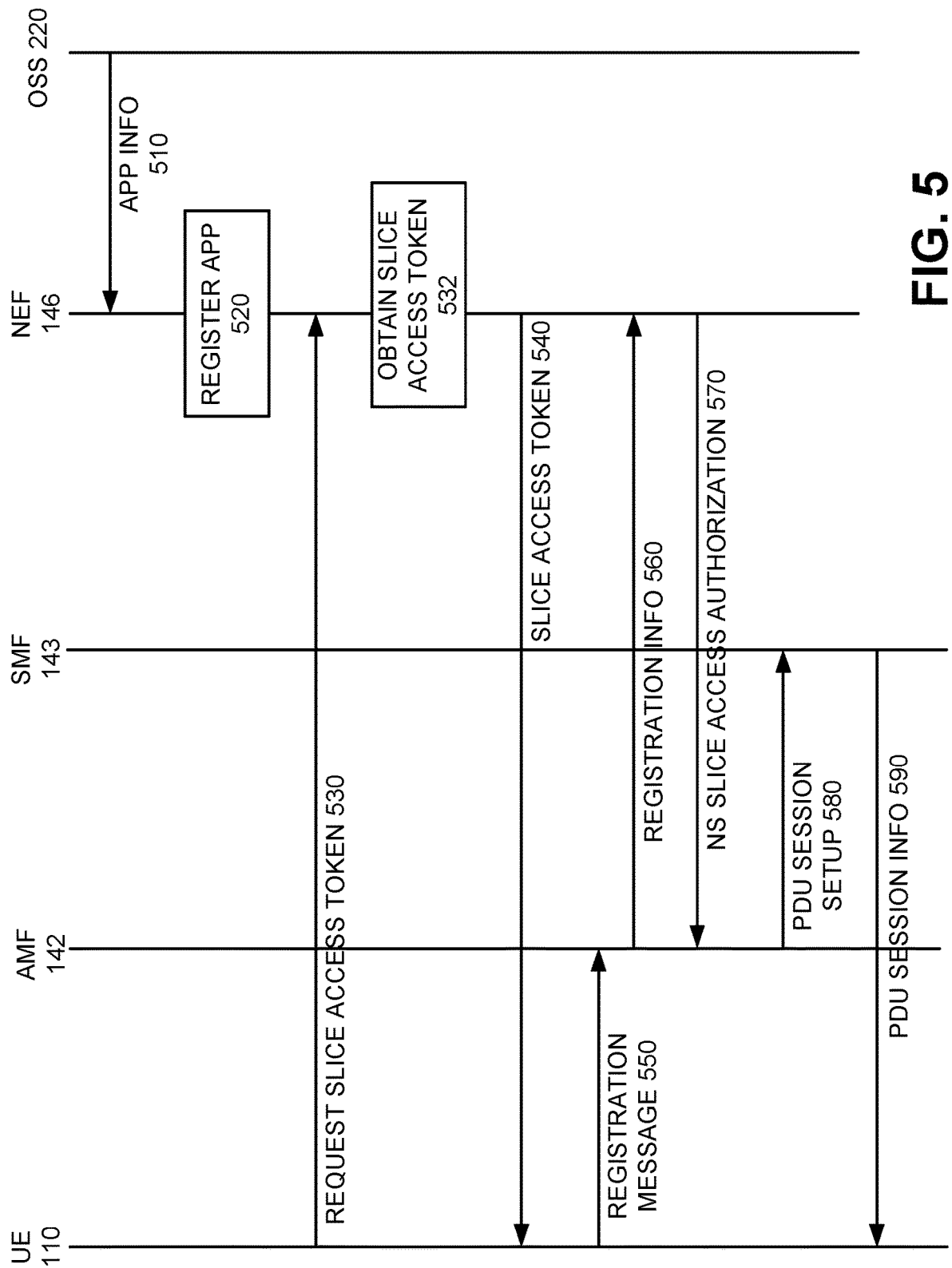
FIG. 5 is an exemplary signal flow diagram associated with the processing of FIG. 4.

FIG. 4 is a flow diagram illustrating processing associated with network slice access authorization in accordance with an exemplary implementation. FIG. 5 is a signal flow diagram illustrating exemplary signal flows associated with the processing of FIG. 4. Processing may begin with an application being stored in application repository 210. For example, OSS 220 or another device in environment 100 may approve an application for storage in application repository 210. OSS 220 may assign an application identifier (ID) to the application and a service ID to the application (block 410). OSS 220 may assign the service ID to applications stored in app repository 210 to effectively tie particular classes of applications to particular service categories. The service categories may then be assigned to network slices. When a UE 110 accesses applications stored in app repository 210, the UE 110 receives the application ID and service ID and uses this information for network slice access authorization, as described in detail below.

For example, OSS 220 may assign a particular service ID to gaming applications, assign another service ID to industrial Internet of Things (IIOT) applications, such as an application associated with ultra reliable low latency communications (URLLC), assign still another service ID to business related applications, etc. In this case, assume that the application is a video game. OSS 220 may assign an application ID, such as Game X to the application, and a Service ID, such as Game Network Slice (NS)-1 to the application, indicating that Game X can be serviced with NS 1. OSS 220 may forward the application ID and service ID to NEF 146 (block 410; FIG. 5, 510).

Figure 6:
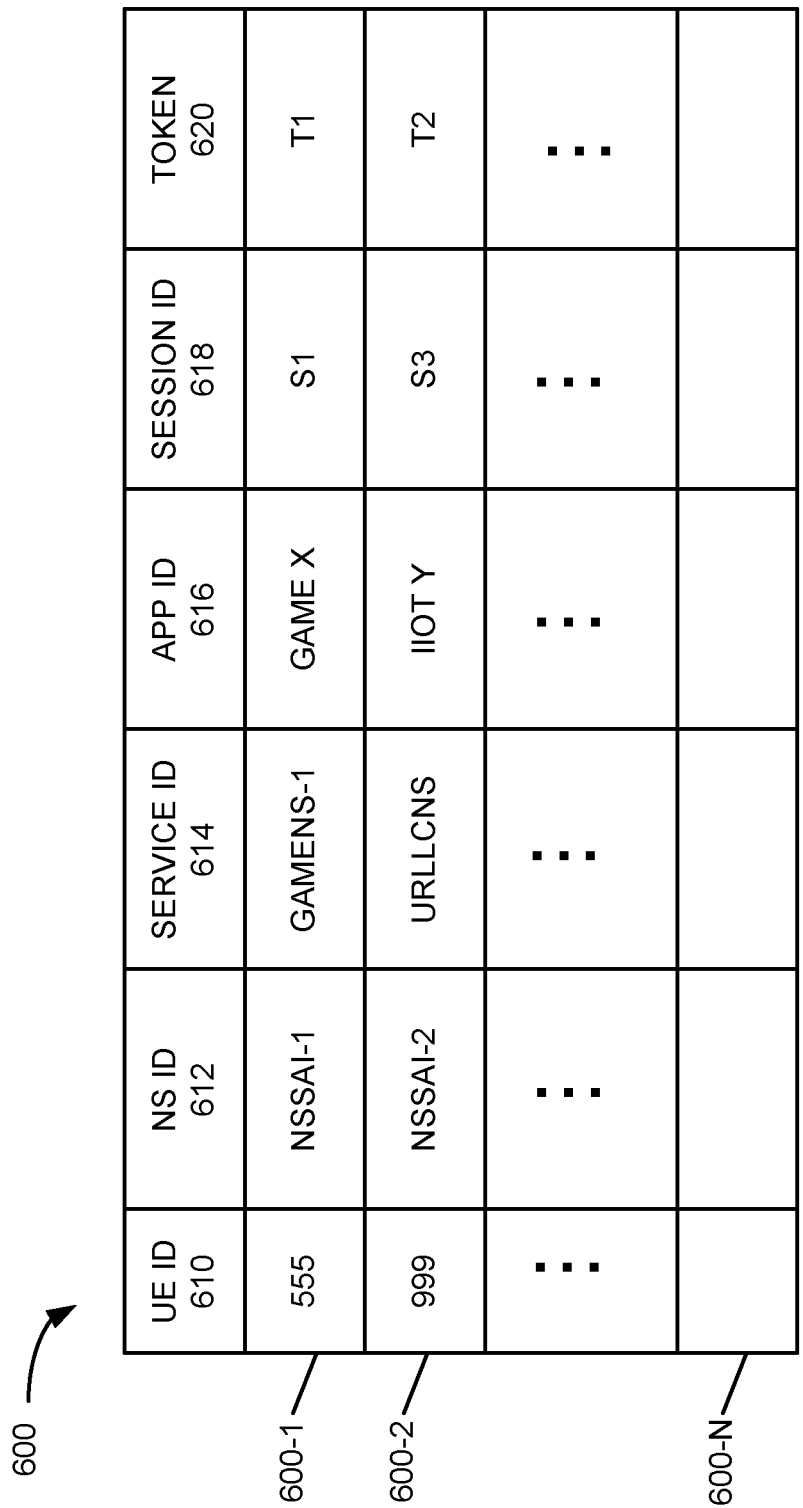
FIG. 6 illustrates an exemplary database used in connection with the processing of FIG. 4.

NEF 146 receives the application information for Game X and registers the application by storing the application ID and service ID in a database within NEF 146 (block 420; FIG. 5, 520). For example, FIG. 6 illustrates an exemplary database 600 included in NEF 146. In alternative implementations, database 600 may be located externally from NEF 146 (e.g., in AMF 142, SMF 143, NSSF 145, etc.) and accessible by NEF 146, AMF 142, SMF 143, NSSF 145, etc. Referring to FIG. 6, database 600 includes a UE ID field 610, a Network Slice ID field 612, a Service ID field 614, an Application ID field 616, a Session ID field 618 and a token field 620.

As illustrated in row 600-1 of table 600, NEF 146 may store a service ID of GameNS-1 in field 614 and an application ID of Game X in field 616. NEF 146 may also access NSSF 145 to obtain a network slice ID, such as network slice selection assistance information (NSSAI), that identifies a particular slice for servicing a session associated with UE 110-1 executing Game X. In this example, NSSF 145 may identify network slice selection assistance information (NSSAI) that uniquely identifies a particular slice, such as NSSAI-1. NSSF 145 may forward this information to NEF 146 for storage in database 600 (e.g., in NS ID field 612 in row 600-1, as illustrated in FIG. 6). NEF 146 may also optionally store an access token and/or information identifying an access token for NSSAI-1, such as information identifying token 1 (T1) in token field 620 of row 600-1, as also illustrated in FIG. 6 (block 420). The token, if used, provides additional security with respect to ensuring a UE 110 is authorized to use a particular network slice, as described in detail below.

As also illustrated in row 600-2 of table 600, a NS ID, service ID may be stored for another application, accessed by another UE 110. For example, a UE 110 identified with UE ID 999 may be associated with an IIOT application Y (stored in app ID field 616 of row 600-2) and having a service ID of URLLC Network Slice (stored in service ID field 614). As illustrated, different applications have different service IDs, NS IDs, use different tokens, etc.

Assume that a user at UE 110-1 wishes to play Game X. In an exemplary implementation, UE 110-1 may access Game X from application repository 210 or from storage within UE 110-1 if Game X has already been downloaded by the user at UE 110-1. In either case, when Game X is executed/launched, UE 110-1 may transmit a request for a network slice access token to NEF 146 (FIG. 5, 530). NEF 146 receives the request for the slice access token (block 430). NEF 146 may then identify the particular UE 110-1 based on a UE ID included in the request, the application ID (i.e., Game X) and/or the service ID (GameNS-1) and obtain the access token associated with Game X and the corresponding service ID (block 532).

For example, NEF 146 may access database 600 and identify the access token for Game X in row 600-1, field 620. In this example, the access token is T1. As described previously, NEF 146 may obtain network slice selection assistance information (NSSAI) from NSSF 145 and obtain an access token corresponding to the NS ID provided by NSSF 145. For example, NEF 146 may obtain a slice access token for the particular application from authorization device 230. In other implementations, the token T1 generated by authorization device 230 may be previously stored in database 600. In either case, NEF 146 may provide the network slice access token T1 to UE 110-1 (block 430; FIG. 5, 540). UE 110-1 receives the network slice access token.

Assume that UE 110-1 initiates a registration service request associated with a session for playing Game X. For example, UE 110-1 may transmit a registration request message that includes a UE ID associated with UE 110-1, an Application ID, a Service ID, an NSSAI, and/or the access token received from NEF 146, as well as other information, such as a data network name (DNN) associated with the request (FIG. 5, 550). AMF 142 may receive the registration request message from UE 110-1 (block 440). AMF 142 may then determine whether UE 110-1 is authorized to access the particular requested network slice based on the UE ID, Service ID, NSSAI and/or token included in the registration message (block 450).

For example, NEF 146 may determine whether the UE ID, NS ID, Service ID, App ID and/or token provided in the registration message correspond to the information stored in database 600 for the particular UE 110-1 and service ID. For example, AMF 142 may signal NEF 146 to determine whether the UE ID included in the registration message identifies a UE 110 that is authorized to use the particular slice identified by the service ID and NSSAI included in the registration message based on performing a lookup in database 600. NEF 146 may also signal authorization device 230 to validate the token included in the registration message.

Assume that NEF 146 determines that the information in the registration request message matches the information stored in database 600 and NEF 146/authorization device 230 determines that the token is valid. In this case, NEF determines that UE 110-1 is authorized to use the particular network slice identified in the registration message and/or associated with the provided token (block 450—yes).

NEF 146 may signal AMF 142 that UE 110-1 is authorized to use the network slice (FIG. 5, 570). AMF 142 and/or NEF 146 may then signal SMF 143 to initiate a PDU session for UE 110-1 with the particular network slice (i.e., NSSAI-1) servicing the PDU session (block 460; FIG. 5, 580). SMF 143 may provide PDU session information to UE 110-1, and SMF 143 may then establish the PDU session using the particular network slice (block 470; FIG. 5, 590).

Referring back to block 450, if AMF 142/NEF 146 determines that UE 110-1 is not authorized to use the requested network slice for executing Game X (block 450—no), NEF 146 may signal SMF 143 to initiate a PDU session for UE device 110-1, but without using the resources corresponding to the particular network slice (block 480). For example, if the service ID and/or NS ID included in the registration message do not match the information stored in database 600 and/or the access token is not validated, this may indicate that a UE 110 is attempting to access a network slice for which UE is not authorized. In this case, SMF 143 may provide a PDU session for UE 110-1, but without using resources associated with the requested network slice. In alternative implementations, SMF 143 may not establish a PDU session when UE 110-1 is attempting to access a network slice for which UE 110-1 is not authorized, and SMF 143 may send an alert to, for example, OSS 220.

In this manner, elements in core network 130 may determine whether a UE 110 is authorized to use a network slice, prior to initiating a PDU session. This may help prevent network slices from becoming overloaded by unauthorized data traffic.

As described above with respect to FIGS. 4 and 5, in one implementation, a UE 110 may initiate a request for network slice authorization and obtain network slice information with respect to particular applications executed by UE 110. In other implementations, other devices may initiate the provisioning of network slice authorization information to UEs 110, such as an application service provider/server, as described in detail below.

FIG. 7 is a flow diagram illustrating processing associated with network slice access authorization in accordance with another exemplary implementation. Processing may begin in a similar manner as described above with respect to FIGS. 4 and 5. For example, OSS 220 or another device in environment 100 may approve an application for storage in application repository 210. OSS 220 may assign an application ID to the application and a service ID to the application (block 710). The service categories may be assigned to network slices.

For example, OSS 220 may assign a particular service ID to gaming applications, assign another service ID to IIOT applications, assign still another service ID to business related applications, etc. Similar to the implementation described above, assume that the application is a video game. OSS 220 may assign an application ID of Game X to the application, and a Service ID of Game NS-1 to the application, indicating that Game X can be serviced with NS 1. OSS 220 may forward the application ID and service ID to NEF 146 (block 710).

NEF 146 receives the application information for Game X and registers the application by storing the application ID and service ID database 600 (block 720). NEF 146 may also access NSSF 145 to obtain a network slice ID, such as NSSAI that identifies a particular slice for servicing a session associated with UE 110-1 executing Game X, such as NSSAI-1. NEF 146 may obtain a network slice access token for the particular application from authorization device 230. NEF 146 may also store the access token or information identifying the access token for NSSAI-1, such as information identifying token 1 (T1) in database 600 (block 720).

In this implementation, NEF 146 may forward the access token and/or information identifying the token to application service provider 160. Application service provider 160 may then push the token associated with GameNS-1 to UE device 110-1 (block 730). In an exemplary implementation, NEF 146 may also provide the token to other elements in core network 130, such as PCF 148, via, for example, UE route selection policy (URSP) signaling. In each case, application service provider 160 initiates the process associated with providing a network slice authorization token to UE 110-1. That is, the token is sent to UE 110-1 without UE 110-1 requesting the token.

Assume that a user at UE 110-1 wishes to play Game X. As described previously, UE 110-1 may access Game X from application repository 210 or from storage within UE 110-1 if Game X has already been downloaded by the user at UE 110-1. In either case, UE 110-1 may initiate a registration service request associated with a session for playing Game X. For example, UE 110-1 may transmit a registration request message that includes a UE ID associated with UE 110-1, an Application ID, a Service ID, an NSSAI, and/or the access token received from application service provider 160, as well as other information, such as DNN associated with the request. AMF 142 may receive the registration request message from UE 110-1 (block 740). AMF 142 may then determine whether UE 110-1 is authorized to access the particular requested network slice corresponding to the NSSAI and token included in the registration message (block 750).

For example, as described above with respect to FIGS. 4 and 5, NEF 146 may determine whether the UE ID, NS ID, Service ID, App ID provided in the registration message correspond to the information stored in database 600 for the particular UE 110-1. For example, AMF 142 may signal NEF 146 to determine whether the UE identified by the UE ID included in the registration message is authorized to use the particular slice identified by the service ID, NSSAI included in the registration message. NEF 146 may also signal authorization device 230 to validate the token included in the registration message.

Assume that NEF 146 determines that the information in the registration request matches the information stored in database 600 for the particular Service ID and app ID and that the token is valid. In this case, NEF determines that UE 110-1 is authorized to use the particular network slice identified in the registration message and/or associated with the access token (block 750—yes).

NEF 146 may signal AMF 142 that UE 110-1 is authorized to use the network slice. AMF 142 and/or NEF 146 may then signal SMF 143 to initiate a PDU session for UE 110-1 with the particular network slice (i.e., NSSAI-1) servicing the PDU session (block 760). SMF 143 may provide PDU session information to UE 110-1 and SMF 143 may then service the PDU session using the particular network slice (block 770).

Referring back to block 750, if AMF 142/NEF 146 determines that UE 110-1 is not authorized to use the requested network slice for executing Game X (block 750—no), NEF 146 may signal SMF 143 to initiate a PDU session for UE device 110-1, but without using the resources corresponding to the particular network slice (block 780). For example, if the NS ID included in the registration message does not match the information stored in database 600 and/or the token is not validated, this may indicate that a UE 110 is attempting to access a network slice for which UE 110 is not authorized. In such cases, SMF 143 may establish the PDU session, but not service the PDU session with the requested network slice. In other implementations, SMF 143 may not set up the PDU session for UE 110-1 when UE 110 is attempting to access a network slice for which UE 110 is not authorized.

Implementations described herein provide for network slice access authorization performed by elements in a core network. For example, implementations described herein provide for network-based network slice authorization prior to setting up a data session. This may allow a service provider to ensure that the use of network slices is limited to authorized users.

The foregoing description of example implementations provides illustration and description, but is not intended to be exhaustive or to limit the embodiments to the precise form disclosed. Modifications and variations are possible in light of the above teachings or may be acquired from practice of the embodiments.

For example, features have been described above with respect to providing network slice authorization using elements in core network 130. In other implementations, similar processing may be performed in other portions of environment 100, such as in a Multi-access Edge Computing (MEC) platform located, for example, between access network 120 and core network 130.

Further, while series of acts have been described with respect to FIGS. 4 and 7 and signal flows with respect to FIG. 5, the order of the acts and signal flows may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   receiving, by at least one network device and from a user device, a registration message including a service identifier, a network slice identifier and a network slice token;
   determining, based on the network slice identifier and the network slice token, whether the user device is authorized to use a network slice associated with the service identifier; and
   setting up a data session to be serviced by the network slice, in response to determining that the user device is authorized to use the network slice.

2. The method of claim 1, wherein the at least one network device comprises an access and mobility management function and a network exposure function.

3. The method of claim 1, further comprising:
   storing, in a database located in a core network and accessible by the at least one network device, an application identifier (ID), a network slice ID, and a network slice token associated with a network slice for each of a plurality of different applications.

4. The method of claim 3, wherein the determining whether the user device is authorized to use the network slice further comprises:
   accessing the database to determine whether the application identifier and the network slice ID included in the registration message, for an application executed by the user device, match information stored in the database for the application; and
   validating the network slice token.

5. The method of claim 1, further comprising:
   transmitting, to the user device, the network slice token for an application to be executed by the user device.

6. The method of claim 1, wherein the determining comprises determining that the user device is not authorized to use the network slice, the method further comprising:
   setting up, for the user device, a data session that will not use the network slice.

7. The method of claim 1, further comprising:
   receiving, by the at least one network device and from the user device, a request for a network slice token, wherein the request includes a service identifier associated with an application; and
   providing, by the at least one network device, the network slice token based on the service identifier.

8. The method of claim 1, further comprising:
   providing, to the user device and not in response to a request from the user device, the network slice token.

9. The method of claim 8, wherein the providing is performed by an application server.

10. A system, comprising:
    at least one device configured to:
       receive, from a user device, a registration message including a service identifier and a network slice token;
       determine, based on the service identifier and the network slice token, whether the user device is authorized to use a network slice associated with the service identifier; and
       set up a data session to be serviced by the network slice, in response to determining that the user device is authorized to use the network slice.

11. The system of claim 10, wherein the at least one device comprises an access and mobility management function and a network exposure function.

12. The system of claim 10, wherein the at least one device is further configured to:
  store, in a database located in a core network and accessible by the at least one device, an application identifier (ID), a network slice ID, and a network slice token associated with a network slice for each of a plurality of different applications.

13. The system of claim 12, wherein when determining whether the user device is authorized to use the network slice, the at least one device is further configured to:
  access the database to determine whether the network slice ID and the network slice token included in the registration message, for an application executed by the user device, match information stored in the database for the application; and
  validate the network slice token.

14. The system of claim 10, wherein the at least one device is further configured to:
  transmit, to the user device, a network slice token for an application to be executed by the user device.

15. The system of claim 10, wherein when determining, the at least one device is configured to determine that the user device is not authorized to use the network slice, and wherein the at least one device is further configured to:
  set up, for the user device, a data session that will not use the network slice.

16. The system of claim 10, wherein the at least one device is further configured to:
  receive, from the user device, a request for a network slice token, wherein the request includes a service identifier associated with an application; and
  provide, by the at least one device and based on the service identifier, the network slice token.

17. The system of claim 10, wherein the at least one device is further configured to:
  provide, to the user device and not in response to a request from the user device, the network slice token.

18. The system of claim 17, wherein the at least one device comprises an application sever configured to provide the network slice token.

19. The method of claim 1, further comprising:
  servicing the data session using the network slice associated with the network slice identifier, in response to determining that the user device is authorized to use the network slice.

20. The system of claim 10, wherein the registration message includes a network slice identifier and the at least one device is further configured to:
  service the data session using the network slice associated with the network slice identifier, in response to determining that that user device is authorized to use the network slice.

* * * * *